Jan. 17, 1967

G. H. RAWCLIFFE ETAL 3,299,337

POLE-CHANGING, THREE-PHASE, ALTERNATING
CURRENT, ELECTRIC MOTORS
AND GENERATORS

Filed July 22, 1963

Jan. 17, 1967 G. H. RAWCLIFFE ETAL 3,299,337
POLE-CHANGING, THREE-PHASE, ALTERNATING
CURRENT, ELECTRIC MOTORS
AND GENERATORS
Filed July 22, 1963 8 Sheets-Sheet 2

Fig.5.

INVENTORS
Gordon Hindle Rawcliffe
William Fong
BY
Stevens, Davis, Miller & Mosher
ATTORNEYS

United States Patent Office 3,299,337
Patented Jan. 17, 1967

3,299,337
POLE-CHANGING, THREE-PHASE, ALTERNATING CURRENT, ELECTRIC MOTORS AND GENERATORS
Gordon Hindle Rawcliffe, Clifton, Bristol, and William Fong, Bristol, England, assignors to National Research Development Corporation, London, England
Filed July 22, 1963, Ser. No. 296,826
Claims priority, application Great Britain, July 24, 1962, 2,838/62
5 Claims. (Cl. 318—224)

This invention relates to three-phase, pole-changing rotary electric machines having at least one three-phase winding in which the change of pole-number is effected by pole-amplitude modulation and particularly this invention relates to such machines providing one pole-number which is three pole-pairs or a multiple thereof.

Prior British Patent No. 900,600, corresponding to U.S. Patent 3,233,159, discloses the general theory of pole changing by pole-amplitude modulation. By this method a three-phase winding wound in conventional manner to provide P pole-pairs is pole-amplitude modulated by a pole-amplitude modulation wave of M cycles applied to each phase-winding, to provide $(P+M)$ and $(P-M)$ pole-pairs in each phase-winding considered individually.

By choice of phase-sequence, one of the modulated pole-numbers $(P+M)$, $(P-M)$ pole-pairs is eliminated in the three-phase electromagnetic field provided by the winding as a whole. This arrangement provides a machine for operation at P pole-pairs and whichever of the pole-numbers $(P+M)$, $(P-M)$ pole-pairs is not eliminated by simple series-parallel switching of the phase-windings.

The said prior British Patent No. 900,600 (U.S. 3,233,159) further describes embodiments for providing alternative pole-numbers neither of which is three pole-pairs or a multiple thereof. That is to say, the original pole-number, P pole-pairs, is not three pole-pairs, nor is the residual pole-number $(P+M)$ pole-pairs or $(P-M)$ pole-pairs, as the case may be, which is the operative pole-number in the modulated connection of the phase-windings.

It will be evident by inspection that of the three pole-numbers P, $(P+M)$ and $(P-M)$, one must always be three pole-pairs or a multiple thereof, except when M is itself three or a multiple thereof. Thus, in the embodiments described in the abovementioned prior patent, a pole-number which is a multiple of three pole-pairs, or three pole-pairs, is created by modulation and this is always the pole-number which is eliminated by the choice of phase-sequence. This provides the original pole-number P pole-pairs and the residual modulated pole-number as operative pole-numbers, neither of them being three pole-pairs or a multiple thereof.

Prior British Patent No. 926,101, corresponding also to U.S. Patent 3,233,159, describes embodiments of the method of pole-changing by pole-amplitude modulation when one of the operative pole-numbers is three pole-pairs or a multiple thereof. Two cases are particularly considered. The first is when the original pole-number P pole-pairs is three pole-pairs or a multiple thereof. In this case, neither modulated pole-number $(P+M)$ or $(P-M)$ pole-pairs is three pole-pairs or a multiple thereof. The second case is when the original pole number P pole-pairs is not three pole-pairs or a multiple thereof. In this case, one of the modulated pole-numbers $(P+M)$, $(P-M)$ pole-pairs is three pole-pairs or a multiple thereof. This is the pole-number chosen by the phase-sequence to be the operative modulated pole-number.

The present invention relates particularly to the above-mentioned second case of pole-changing rotary electric machines and the object of the invention is to provide improved machines for certain pole-number combinations, of which 4-pole/6-pole, 8-pole/6-pole and 2-pole/12-pole machines are specific examples.

Accordingly, the present invention provides for a pole-changing rotary electric machine having a three-phase alternating current winding comprising three phase-windings each with coils wound and connected to provide a first number of poles other than three pole-pairs or a multiple thereof and having switch means for reconnecting the coils of each phase-winding according to a pole-amplitude modulation wave extending over the three-phase winding as a whole, said wave comprising an odd number of complete cycles other than three or a multiple thereof, whereby a second number of poles is provided which number is three pole-pairs or a multiple thereof, a magnetomotive field corresponding to a third number of poles, which number is not three pole-pairs or a multiple thereof being suppressed by the arrangement of the coils of the three-phase winding, a method of selecting said coils for reconnection to provide said second number of poles comprising selecting a frame for the said three-phase winding which has substantially three slots per pole per phase, or a multiple thereof, for the said second number of poles and selecting substantially one-half the total number of coils of each phase-winding for reversal in circuit upon said reconnection in a manner both to provide the said pole-amplitude modulation wave extending over the three-phase winding as a whole and to provide that each phase-winding is substantially geometrically balanced about the neutral line for the phase, as shown by a slot-star diagram for each of the three phase-windings.

A development of the theory of pole-amplitude modulation by which the modulation of a three-phase winding can be more conveniently envisaged by a single pole-amplitude modulating wave extending around the periphery of the three-phase winding as a whole, instead of three separate waves applied one to each of the three phase-windings, is disclosed in Patent 3,197,686.

Such an arrangement can be used to provide alternative pole numbers, that is the original and operative modulated pole-numbers, which are in wide ratio. In such cases of wide-ratio pole-numbers, it is usually most convenient to eliminate the unwanted modulated pole-number by choice of chording of the three-phase winding.

In the practical embodiments disclosed in the last-mentioned prior applications, the original pole number P pole-pairs is not three pole-pairs or a multiple thereof, the single pole-amplitude modulating wave has three cycles or a multiple thereof, but the residual pole-number is not three pole-pairs or a multiple thereof.

The present invention may be applied to windings for a pole-number P pole-pairs, which is not three pole-pairs or a multiple thereof, to provide a modulated pole-number which is three pole-pairs or a multiple thereof. The single, pole-amplitude modulation wave, applied to the three-phase winding as a whole, generally does not have three cycles or a multiple thereof.

The use of a single pole-amplitude modulation wave, applied to a three-phase winding as a whole, the wave not having three cycles or a multiple thereof, always provides, without the further measures to be described, a winding which is unbalanced between phases.

There are two requirements for a practical winding, therefore. The first requirement is to eliminate the unwanted modulated pole-number. The second requirement is to balance the three-phase winding between phases. The present invention explains in particular how the second requirement can be met.

Two such examples are where:

(i) The original pole-number is 2 pole-pairs, the overall modulation wave is 1 cycle, the modulated pole-numbers are 1 pole-pair and 3 pole-pairs together and the residual modulated pole-number is 3 pole-pairs;

(ii) The original pole-number is 1 pole-pair, the overall modulation wave is 7 cycles, the modulated pole-numbers are 6 pole-pairs and 8 pole-pairs and the residual modulated pole-number is 6 pole-pairs.

Of the last-mentioned two examples, the first provides alternative pole-numbers in close-ratio and the second in wide-ratio.

In the latter case, giving alternative pole-numbers in wide-ratio, it is convenient to eliminate the unwanted field of 8 pole-pairs by suitable chording. It will be noted that 4 pole-pitches for 16-poles corresponds to 3 pole pitches for 12-poles and the field of 8 pole-pairs will disappear when the field of 6 pole-pairs is at full amplitude.

In the former case, where the unwanted modulated pole-number is 1 pole-pair, this 2-pole field forms only a low-order subharmonic of the residual pole-number of 6-poles and, for a squirrel-cage induction motor, this sub-harmonic can be ignored. The 2-pole sub-harmonic magnetomotive force is almost entirely neutralized by the squirrel-cage, so that the 2-pole sub-harmonic flux is of very low amplitude.

It remains therefore, in the above two examples and in all other embodiments of the invention, to balance the three-phase winding between phases for the two operative pole-numbers.

In general, it can be shown that a three-phase winding can be balanced for any one pole-number which is three pole-pairs or a non-triplen multiple thereof, provided that the winding is wound on a frame so as to have 3 slots per phase, or a multiple thereof.

A three-phase winding providing pole-changing by pole-amplitude modulation has each phase-winding wound in two equal parts. Accordingly, it is here required for the winding to have 6 slots per phase, or a multiple thereof. Additionally, it is desirable for the winding to be wound on a frame having a slot-number equal to or nearly equal to three-times the pole-number, or a multiple thereof, so as to provide a satisfactory winding with about one slot per pole per phase, or a multiple thereof.

The practical method for designing a balanced three-phase winding for a machine according to the present invention is to draw a vector-star diagram, by means of which the E.M.F. corresponding to the coil sides in each slot of the winding is represented in magnitude and direction. This coil-slot, vector-star pattern repeats itself every two pole-pitches of the resultant pole-number around the machine perimeter. For brevity, such diagrams are described below as slot-star diagrams.

Because the modulated pole-number is three pole-pairs or a multiple thereof, it is possible to divide this slot-star diagram into three identical parts. If each part contains a multiple of three slots, it is possible to treat each of the three parts in identical manner, repeating a pattern at an angular spacing of 120° around the machine perimeter, so that a balanced winding results.

In order that the invention may readily be carried into effect, a number of practical embodiments, which illustrate the present invention, by way of example, will now be described in detail, both as regards their physical form and as regards the use of the slot-star diagram method to derive the physical form for each embodiment, with reference to the accompanying drawings, in which.

Figure 1:
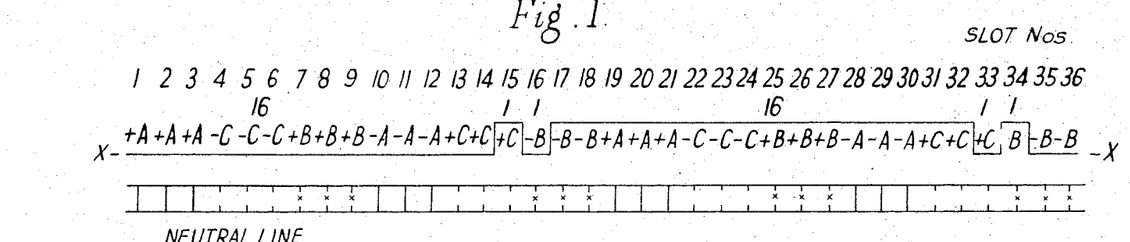
FIG. 1 is a slot-phaseband diagram of a 4-pole/6-pole machine wound in a 36-slot frame.

In the diagram of FIG. 1, the first row shows the slot-numbers of the frame from 1 to 36. The third line shows the phase-band distribution of an integral-slot, 4-pole, three-phase winding having 3 slots per pole per phase.

It will be seen that mere reversal of the second eighteen coils, slots 19 to 36, with respect to the first eighteen coils, slots 1 to 18, provides modulated pole-numbers of 3 pole-pairs and 1 pole-pair together, but the winding is unbalanced.

Figure 2:
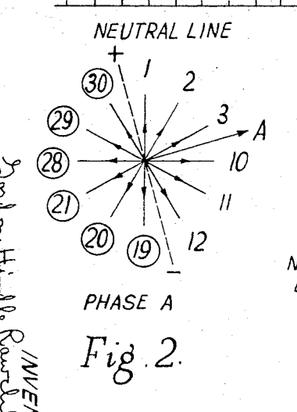
FIGS. 2, 3 and 4 are slot-star diagrams for phase A, phase C and phase B, respectively, of the same 4-pole/6-pole machine to which FIG. 1 relates.
Figure 3:
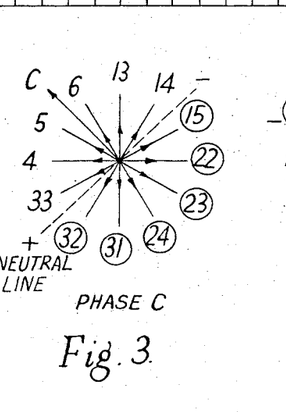
Figure 4:
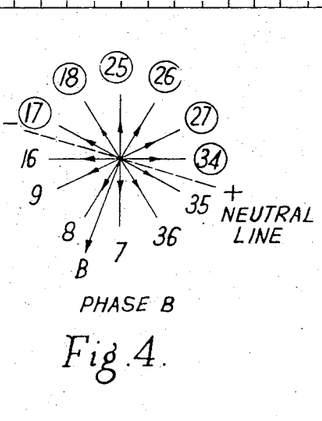

FIGS. 2, 3 and 4 show the slot-star diagrams for phases A, C and B, respectively. The vectors of phase A are drawn with vector 1, slot 1 in the vertical position. The spacing between successive slots is 30° electrical with respect to 6-poles. The encircled vector, and slot, numbers indicate the coils reversed in circuit by the simple reversal pattern: 1–18, reverse 19–36, referred to above.

FIG. 3 represents an identical slot-star diagram for phase C, with vector 13, slot 13 in the vertical position.

FIG. 4 represents an identical slot-star diagram for phase B, with vector 25, slot 25 in the vertical position.

It will be noted that the slot-star diagrams of FIGS. 3 and 4 do not now correspond to the simple reversal pattern: 1–18, reverse 19–36, referred to above. For phase C, coil 33 is not reversed on modulation but coil 15 is reversed. For phase B, the coils 35 and 36 are not reversed on modulation but coils 17 and 18 are reversed.

However, the patterns of FIGS. 2, 3 and 4 are identical and as each one is balanced about its own neutral line, they combine to provide a balanced three-phase winding.

Referring again to FIG. 1, it will be noted that a line X—X extends either above or below every coil of the winding. When below, it indicates those coils the sense of which is unchanged for modulation. When above, it indicates the coils reversed in circuit for modulation. The second row of FIG. 1 contains numbers indicating the number of successive coils concerned in normal connection or reversal. It will be seen that the modification of the basic modulation pattern: "leave 18-coils, reverse 18-coils" is small and the coils connected in the original sense and in the reverse sense each total 18 coils, as in the basic pattern.

The fourth row of FIG. 1 shows again the phase bands, phase A being indicated in full line, phase B in -x- line and phase C in broken line.

In the 4-pole/6-pole machine of FIGS. 1 to 4, the phase-band sequence is A, B, C, the phase-sequence after modulation, for the same rotation, is A, B, C and the coil pitch is 6 slots, slot 1 to slot 7 and so on, throughout.

The layer factor after modulation is given by:

$$\tfrac{1}{3}[(\sin 75° + \sin 45° + \sin 15°)] = 0.644$$

Figure 5:
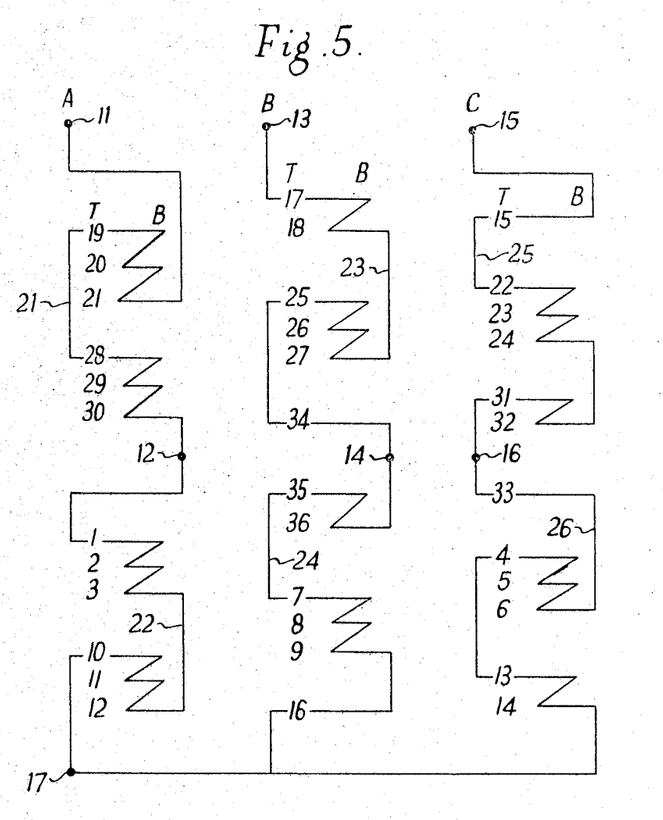
FIG. 5 is a diagram of the winding connections of the 4-pole/6-pole machine of FIGS. 1 to 4, inclusive.

The alternative connections of the machine for 4-pole and for 6-pole operation are shown in FIG. 5. In FIG. 5, the number of the slot, corresponding to FIGS. 1 to 4, wherein the "go" sides of the coil are located at the top of the slot, are shown on the left under the letter T. The corresponding locations of the "return" sides of the coils are at the bottoms of the slots advanced in number by 6 slots, the coil-pitch mentioned, but for simplicity these numbers are omitted under the letter B.

Phase-winding A comprises identical halves 21 and 22 connected in series between terminals 11, 12 and 17. Phase-winding B comprises identical halves 23 and 24 connected in series between terminals 13, 14 and 17; phase-winding C comprises identical halves 25 and 26 connected in series between terminals 15, 16 and 17.

For 4-pole operation, the three phase-windings are connected in parallel star, terminals 11, 13 and 15 being connected together and the windings being supplied from a three-phase supply at terminals 12, 14 and 16.

For 6-pole operation, the three phase-windings are connected in series-star, terminals 12, 14 and 16 being isolated and the three phase supply being connected to terminals 11, 13 and 15, to give the same direction of rotation as for 4-pole operation.

Figures 6, 7, 8, 9:
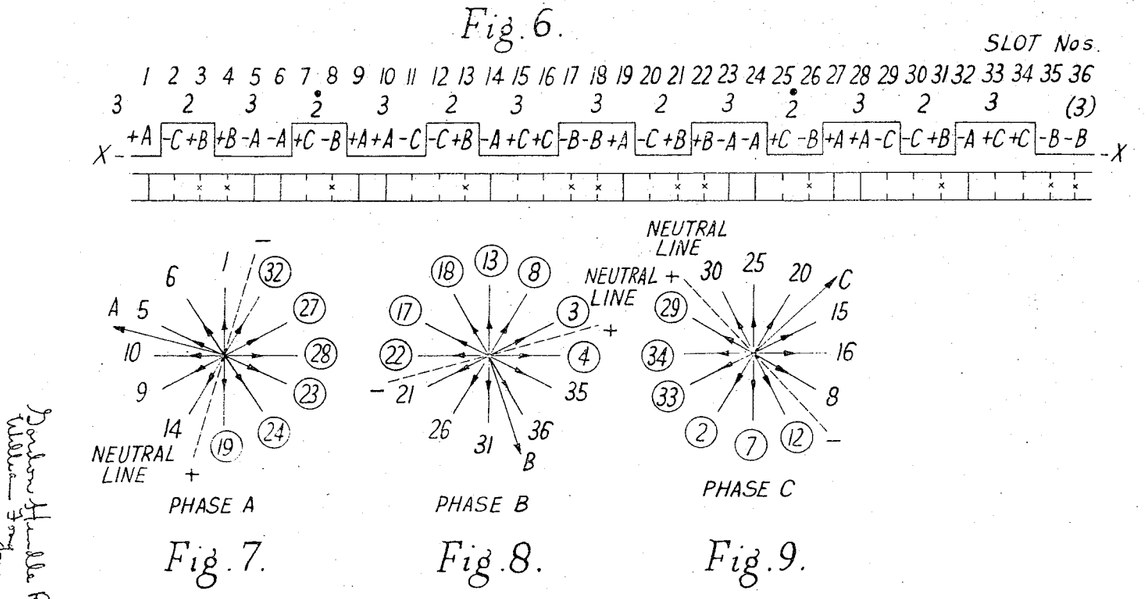
FIG. 6 is a slot-phaseband diagram of an 8-pole/6-pole machine wound in a 36-slot frame.
FIGS. 7, 8 and 9 are slot-star diagrams for phase A, phase B and phase C, respectively, of the 8-pole/6-pole machine to which FIG. 6 relates.

FIGS. 6 to 9 show an 8-pole/6-pole machine. In FIG. 6, the first row indicates the slot numbers of a 36-slot frame and the third row indicates the 8-pole phase-bands wound in the corresponding slots. It will be seen that the three-phase winding shown is a fractional slot winding having the coil-group sequence 1–2–2–1 · · ·1–2–2–1 in each phase winding. The winding is further shown in the fourth row of the diagram where phase A is shown in full line, phase B in -x- line and phase C in broken line.

One slot of the frame corresponds to 30° electrical on a 6-pole scale. The coil pitch may be either 4 slots, 5 slots or 6 slots, that is the top of slot 1 to the bottom of slot 5, the top of slot 1 to the bottom of slot 6 or the top of slot 1 to the bottom of slot 7, respectively, and so on throughout.

FIG. 7 shows the slot-star diagram for phase A, taking the phase neutral line at slot 14, corresponding to the simple modulation pattern: 1–18, reverse 19–36, that is the second half of the phase-winding is reversed in circuit with respect to the first half. The ringed slot numbers again indicate the reversed coils.

FIGS. 8 and 9 respectively show the corresponding slot-star diagrams for phase B and phase C, each derived by using the same pattern of coil reversal as FIG. 7 about neutral lines located at 120° angular displacement relatively to that of phase A. The phase-sequence after modulation is A, C, B for the same sense of rotation as before modulation.

The resultant overall pattern of coil reversal applied to the 8-pole three-phase winding is shown by the line X—X of FIG. 6 which indicates reversal of coils if it extends above and non-reversal of the coils if it extends below. The second row of the diagram shows the number of coil groups in each half-cycle of the overall modulation wave X—X.

The layer factor after modulation is given by:

$$\tfrac{1}{3}[(\sin 75° + \sin 45° + \sin 15°)] = 0.644$$

The feature of the resultant modulated winding of FIG. 5, is that two phase bands of phase B and phase C, and the corresponding coil-groups, are split on modulation to give the following coil grouping, after modulation.

Phase A: 1  –2–2–1   · · ·  1  –2–2–1
Phase B: 1/1–2–1–1   · · ·  1/1–2–1–1
Phase C: 1  –1–2–1/1 · · ·  1  –1–2–1/1

Thus, it is seen that the above-described design method using slot-star diagrams for the three phases provides a solution for the design of pole-changing three-phase machines, using the method of pole-amplitude modulation, where the original winding is a fractional slot winding and the operative modulated pole-number is three pole-pairs or a multiple thereof.

A further embodiment of the invention shown in FIGS. 10 to 13 is an alternative form of 8-pole/6-pole machine wound on a 36-slot frame, wherein the original 8-pole winding has the coil-group sequence 2–2–2–0 · · · 2–2–2–0 in each phase.

Figures 10, 11, 12, 13:
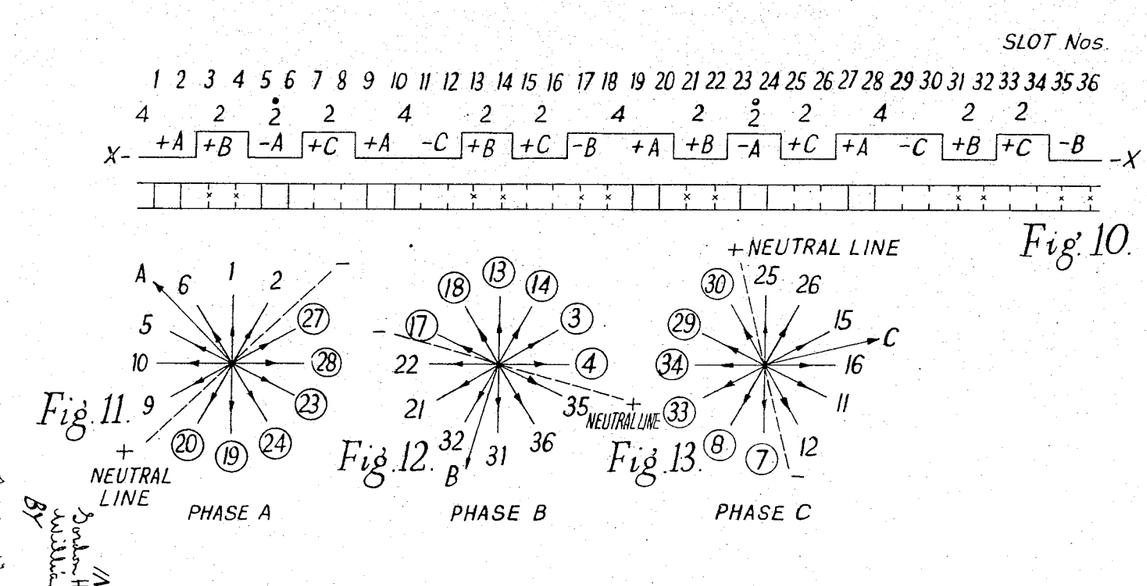
FIG. 10 is a slot-phaseband diagram of an alternative form of 8-pole/6-pole machine, from that of FIGS. 6 to 9 inclusive, also wound on a 36-slot frame.
FIGS. 11, 12 and 13 are slot-star diagrams for phase A, phase B and phase C, respectively, of the alternative 8-pole/6-pole machine to which FIG. 10 relates.

As in the corresponding FIGS. 1 and 6, FIG. 10 shows in the first row the slot number of the 36-slot frame and in the third row the corresponding phase-bands. The fourth row shows the three-phase winding, phase A being in full line, phase B in -x- line and phase C in broken line.

FIG. 11 shows the slot-star diagram for phase A corresponding to the simple modulation pattern 1–18, reverse 19–36, that is reversal, in circuit, of the second half of the phase winding relative to the first half. Again the circled slot numbers indicate the coils reversed on modulation.

FIGS. 12 and 13 are the slot-star diagrams for phase B and phase C, respectively, each derived by a corresponding pattern of coil reversal to provide phase neutral lines at 120° angular displacement to that of phase A. The phase-sequence after modulation for the same sense of rotation is A, C, B as for FIGS. 6 to 9.

The coil pitch may be either 4 slots, 5 slots or 6 slots throughout, that is the top of slot 1 to the bottom of slot 5, the top of slot 1 to the bottom of slot 6 or the top of slot 1 to the bottom of slot 7, respectively, and so on throughout. One slot is 30° electrical on a 6-pole scale.

The resultant modulated winding is shown by the line X—X of FIG. 10, the line passing above those coils reversed on modulation and passing below those coils which are not reversed. The figures in the second row of the diagram indicate the coils grouped in each half cycle of the overall modulation wave X—X.

It will be seen that, after modulation, the resultant coil-grouping is—

Phase A: 2–2–2–0 · · · 2–2–2–0
Phase C: 2–2–0–2 · · · 2–2–0–2
Phase B: 2–0–2–2 · · · 2–0–2–2

The layer factor after modulation is given by:

$$\tfrac{1}{3}[(\sin 70° + \sin 45° + \sin 15°)] = 0.644$$

as before.

Since, in the modulated winding, all coil-groups contain two coils, undivided, the above example indicates a general solution for three-phase windings for 8-pole original, 6-poles modulated, wound in a frame of 18N slots, where N is any integer, the unmodulated coil grouping being of the form N–N–N–0 . . . N–N–N–0 for each phase.

In this general case, the coil-grouping, taking origins on the neutral axes, in the order A, C, B, which corresponds to the pattern of FIGS. 10 to 13, is—

Figure 14:
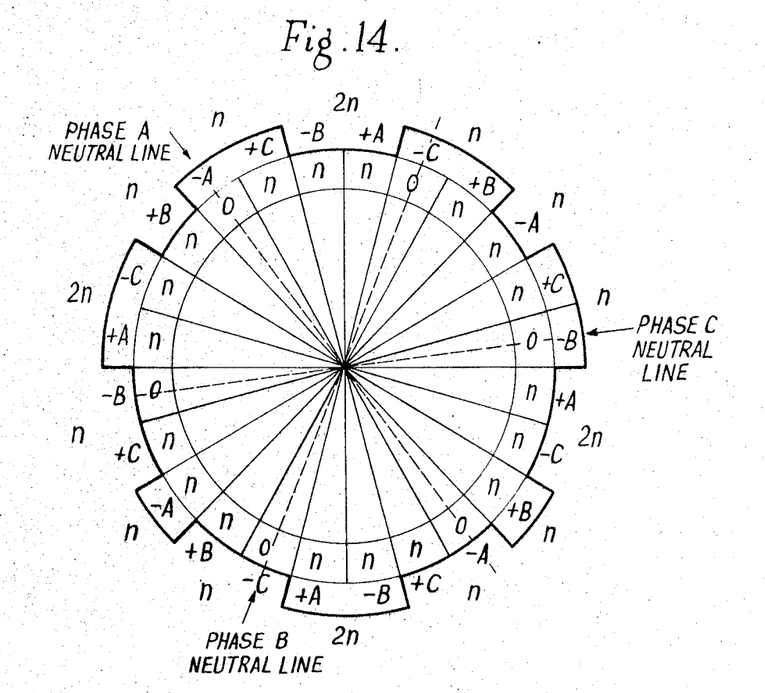
FIG. 14 is a clock diagram showing the 7-cycle pole-amplitude modulation wave applied to the entire three-phase winding of an 8-pole/6-pole machine, similar to that of the specific case of FIGS. 10 to 13 inclusive, showing the general case for winding on a frame of 18N-slots, where N is any integer.

Phase A: N–N–N–0 . . . N–N–N–0
Phase C: N–N–0–N . . . N–N–0–N
Phase B: N–0–N–N . . . N–0–N–N A clock-diagram for this general solution for 8-pole/6-pole machines is given in FIG. 14. In FIG. 14, the overall modulation wave X—X, of 7-cycles, extends outside those coils reversed on modulation and extends inside those coils not reversed.

The phase sequence of the three-phase winding is A, B, C, the phase origin sequence for modulation is A, C, B. The winding is wound to a coil-pitch of between 2½N slots and 3½N slots throughout, the actual value being necessarily integral.

As shown by the outermost ring of numbers, the 7-cycles overall modulation wave has the form:

N–2N–N–N–2N–N

The phase interconnections of the three phase-windings are series-delta for 8-pole working and parallel-star connection of the phase-winding halves for 6-pole working, or vice-versa, depending on the coil-pitch and the desired air-gap flux-density ratios.

Figure 15:
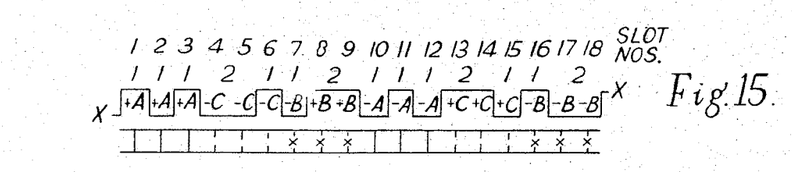
FIG. 15 is a slot-phaseband diagram of a conventional 2-pole winding on an 18-slot frame.

The diagram of FIG. 15 shows a winding of known and conventional form, of a 2-pole, three-phase winding on an 18-slot frame. The first row of the diagram shows the slot numbers from 1 to 18. The third and fourth rows show the phase-band distribution of an integral slot 2-pole winding wound with 3 slots per pole per phase. The third line shows the phase concerned, by letter, indicating the "go" and "return" conductors. The fourth line shows the phase bands A, C and B represented respectively by solid, broken and –x– lines, as in the earlier corresponding diagrams.

The line X—X shows a 7-cycle overall pole-amplitude modulation wave applied to the three-phase winding as a whole. The coils where the X—X line passes above the letter symbol are reversed in circuit upon modulation and the remaining coils are unchanged. The second row of numerals shows the number of coils contained in each half-cycle of the overall pole-amplitude modulation wave.

Considering, first, the conventional 2-pole winding of FIG. 15, the winding can be reconnected according to the 7-cycle pole-amplitude modulation wave of the line X—X of FIG. 15 to provide in combination (1±7) pole-pairs, that is +16 poles and −12 poles, the sign having no significance in respect of pole-number.

If the 16-pole field is removed by chording, the winding then operates as a 12-pole winding. To this end, the coil-pitch is ideally made 3 pole-pitches in relation to 12-poles which is equal to 4 pole-pitches in relation to 16-poles. Then, the chording factor in respect of 12-poles is unity and, in respect of 16-poles, is zero. This is not possible with the 18-slot frame of FIG. 15, because it requires a coil pitch of 4½ slots. However, it is possible if the number of slots is doubled, to 36-slots, as is shown in FIG. 16 when the corresponding coil-pitch is 9-slots.

Figures 16, 17, 18, 19:
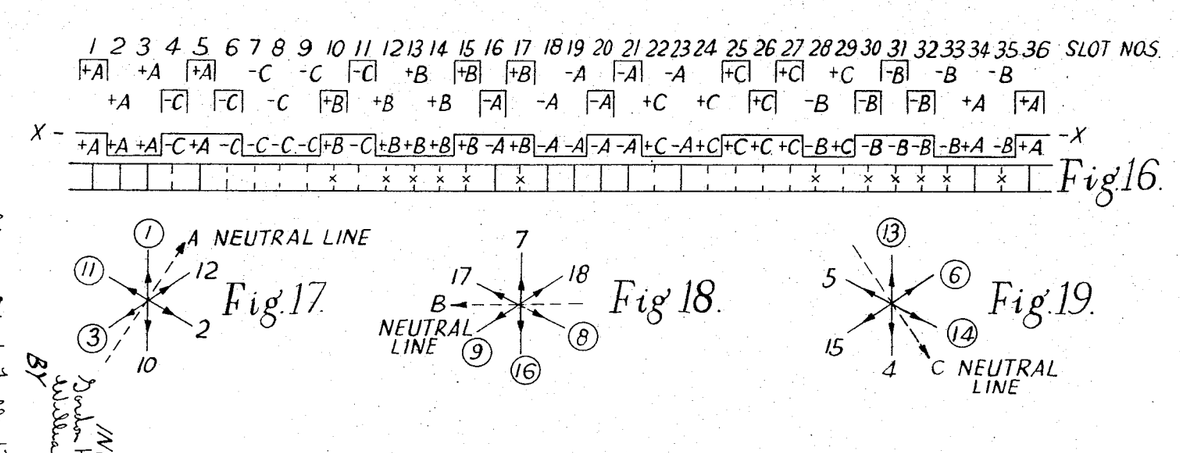
FIG. 16 is a slot-phaseband diagram of a 2-pole/12-pole machine, according to the invention and derived from the conventional winding of FIG. 15, wound on a 36-slot frame.
FIGS. 17, 18 and 19 are slot-star diagrams for phase A, phase B and phase C, respectively, of the 2-pole/12-pole machine to which FIG. 16 relates.

FIGS. 17, 18 and 19 show the slot-star diagrams for phases A, B and C, respectively, for the winding of FIG. 15, for 12-pole working, the coils in the slot-numbers shown in circles being then reversed in circuit as compared with 2-pole working.

For 2-pole working, the supply sequence of the phases is A, B, C; for 12-pole working, the supply sequence, for the same sense of rotation, is A, C, B.

Thus, it will be seen from the above discussion, it is practicable to take the conventional 2-pole winding of FIG. 15 and reconnect it to operate at 12-poles, with the phases all geometrically balanced about the phase neutral lines, as provided by the present invention, by modifying a regular pole-amplitude modulation wave in respect of phases B and C, in the manner shown by the line X—X of FIG. 15 and by the FIGS. 17, 18 and 19, and further by doubling the slot-number of the frame to permit of the critical chording.

However, using the flexibility of design provided by the choice of a 36-slot frame, it is preferred to modify the mere doubling of the winding of FIG. 15, which doubling would in itself provide a machine according to the present invention, in the manner shown in FIG. 16, which modification is a preferred 2-pole/12-pole machine according to the present invention.

According to the modification of FIG. 16, the two component 18-slot windings are combined on a 36-slot frame by staggering one winding by 15-slots relative to the other and by connecting the windings in reverse-series relationship to each other.

This measure of interleaving provides a staggering factor of unity in respect of 12-poles and a staggering factor of 0.966 in respect of 2-poles. The measure provides an improved M.M.F. waveform as regards high-order harmonics.

In FIG. 16, the first row of numerals indicate slot-numbers and the second and third rows show the two component 18-slot windings. The fifth and sixth rows show the amalgamated winding in 36-slots. The line X—X of the fifth row shows, where it passes above coil symbols, those coils which are reversed in circuit for 12-pole working relative to their connection for 2-pole working. Similar representations of coil-reversal are shown for the two component windings in the second and third rows of the diagram. The fourth row shows the number of coils contained in each half-circle of the resultant 7-cycle wave of the line X—X of the fifth row of the diagram.

For this winding, the winding factor for 2-pole working is 0.653 and for 12-pole working is 0.667. The coil-pitch factor for 2-pole working is 0.707 and for 12-pole working is unity. The layer-factor for 2-pole working is 0.955 and for 12-pole working is 0.667.

Figure 20:
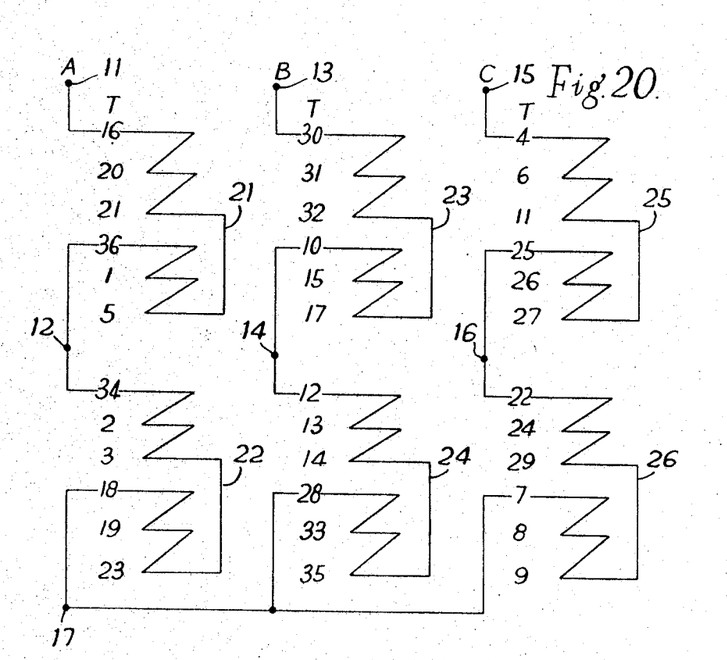
FIG. 20 is a diagram of the winding connections of the 2-pole/12-pole machine of FIGS. 16 to 19, inclusive.

A simplified winding diagram, corresponding in form to FIG. 5, is shown in FIG. 20 and corresponding winding sections are indicated by the same reference numerals in the two diagrams. The three columns of numerals, beneath the letters "T," indicate the slot-numbers wherein the "go" sides of the coil are located at the top of the slot.

The three phase-windings, shown A, B and C, are connected in parallel-star for 2-pole working and in series-star for 12-pole working. To this end, all three phase-windings are connected together at one end at terminal 17. For 2-pole working, the terminals 11, 13 and 15 are joined together and the terminals 12, 14 and 16 are connected to the three-phase supply. For 12-pole working, terminals 12, 14 and 16 are isolated and terminals 11, 13 and 15 are connected to the three-phase supply. Reversal of phase-sequence of the supply is required for the same sense of rotation at the two pole-numbers.

Figure 21:
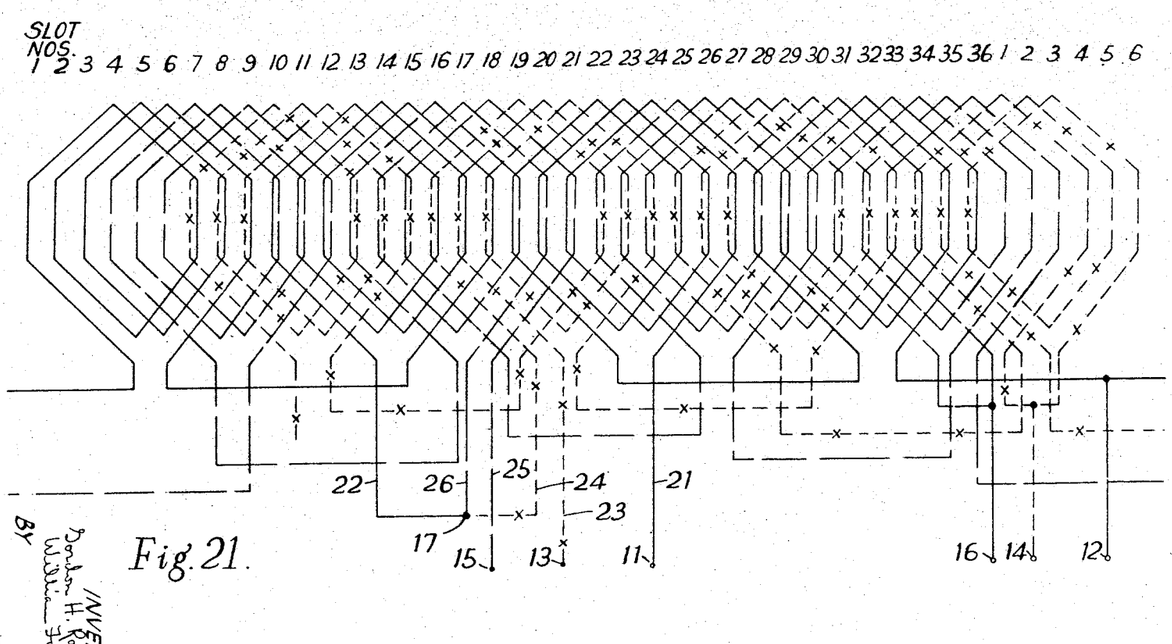
FIG. 21 is a slot winding diagram of the 4-pole/6-pole machine of FIGS. 1 to 5, inclusive.

FIG. 21 shows a complete slot-winding diagram for the 4-pole/6-pole machine of FIGS. 1 to 5. The row of numerals at the head of the diagram indicates slot numbers from 1 to 36, slots 1 to 6 being repeated at the right-hand side of the diagram. Coils of phases A, C and B are indicated, respectively, by solid line, dash line and –x– line, as in FIG. 1. The winding sections and terminals are indicated by the same reference numerals as in FIG. 5. It will be particularly noted that the left-hand sides of the coils shown in FIG. 21, that is the "go" sides of the coils, are to be found in the same slots as indicated by the reference numerals in the three columns "T" of FIG. 5.

FIG. 21 requires no further description and is given solely because it is drawn in conventional form for slot winding diagrams. For the purpose of description of the present invention, however, it is considered that the simplified drawings of FIGS. 1, 6, 10 and 16 give the pertinent information with greater clarity.

What we claim is:

1. For a pole-changing rotary electric machine having a three-phase alternating current winding comprising three phase-windings each with coils wound and connected to provide a first number of poles other than three pole-pairs or a multiple thereof and having switch means for reconnecting the coils of each phase-winding according to a pole-amplitude modulation wave extending over the three-phase winding as a whole, said wave comprising an odd number of complete cycles other than three or a multiple thereof, whereby a second number of poles is provided which number is three pole-pairs or a multiple thereof, a magnetomotive field corresponding to a third number of poles, which number is not three pole-pairs or a multiple thereof being suppressed by the arrangement of the coils of the three-phase winding, a method of selecting said coils for reconnection to provide said second number of poles comprising selecting a frame for the said three-phase winding which has substantially three slots per pole per phase, or a multiple thereof, for the said second number of poles and selecting substantially one-half the total number of coils of each phase-winding for reversal in circuit upon said reconnection in a manner both to provide the said pole-amplitude modulation wave extending over the three-phase winding as a whole and to provide that each phase-winding is substantially geometrically balanced about the neutral line for the phase, as shown by a slot-star diagram for each of the three phase-windings.

2. A pole-changing rotary electric machine having a three-phase alternating current winding comprising three phase-windings each with coils wound and connected to provide a first number of poles other than three pole-pairs or a multiple thereof and having terminal means for reconnecting the coils of each phase-winding according to a pole-amplitude modulation wave extending over the three-phase winding as a whole, said wave comprising an odd number of complete cycles other than three or a multiple thereof, whereby a second number of poles is provided which number is three pole-pairs or a multiple thereof, a magnetomotive field corresponding to a third number of poles, which number is not three pole-pairs or a multiple thereof being suppressed by the arrangement of the said coils of the three-phase winding, said three-phase winding being wound on a frame having substantially three slots per pole per phase, or a multiple thereof, for the said second number of poles, said coils being reconnected by said terminal means thereof for said second pole-number by relative reversal in circuit of substantially, one half the total number of coils of each phase winding, the coils thus reversed in circuit being selected both to provide the said pole-amplitude modulation wave and to provide that each phase-winding is substantially geometrically balanced about the neutral line for the phase.

3. A pole-changing rotary electric machine as claimed in claim 2, in which the three-phase winding comprises N three-phase winding components, where N is a plural integer, each said component winding comprising coils wound in eighteen slots equally spaced apart around a frame having eighteen N slots, said three-phase corresponding coils of said component windings being spaced apart by the same number of slots throughout the winding.

4. A pole-changing rotary electric machine as claimed in claim 3, having N three-phase winding components, where N is an even integer, odd-numbered and even-numbered ones of said N winding components being serially connected together in reverse-series relationship.

5. A pole-changing rotary electric machine as claimed in claim 3, in which said corresponding coils of said component windings are spaced apart by a number of slots exceeding one pole pitch at the higher of said first and second pole-numbers and such as to provide a stagger factor of substantially unity at both said pole-numbers.

References Cited by the Examiner

UNITED STATES PATENTS

| 2,715,204 | 8/1955 | Siskind | 318—224 |
| 2,820,938 | 1/1958 | Davies | 318—224 |
| 3,070,734 | 12/1962 | Rawcliffe | 318—224 |
| 3,175,142 | 3/1965 | Rawcliffe | 318—224 |
| 3,175,144 | 3/1965 | Rawcliffe | 318—224 |

ORIS L. RADER, *Primary Examiner.*

G. Z. RUBINSON, *Assistant Examiner.*